(12) United States Patent
Christen

(10) Patent No.: US 6,390,803 B1
(45) Date of Patent: May 21, 2002

(54) MOVABLE MOLTEN MASS GUIDE SLEEVE TO COMPENSATE FOR TEMPERATURE-DEPENDENT EXPANSION BETWEEN THE HOT CHANNEL AND THE MOLD FEED ORIFICE

(75) Inventor: Andreas Christen, Glashütten (CH)

(73) Assignee: Protool AG, Wynau (CH)

( * ) Notice: Subject to any disclaimer, the term of this patent is extended or adjusted under 35 U.S.C. 154(b) by 0 days.

(21) Appl. No.: 09/381,376

(22) PCT Filed: Jan. 19, 1999

(86) PCT No.: PCT/CH99/00023
§ 371 Date: Sep. 20, 1999
§ 102(e) Date: Sep. 20, 1999

(87) PCT Pub. No.: WO99/37461
PCT Pub. Date: Jul. 29, 1999

(30) Foreign Application Priority Data
Jan. 21, 1998 (CH) .............................................. 134/98

(51) Int. Cl.$^7$ .............................................. B29C 45/27
(52) U.S. Cl. ........................................ 425/549; 425/569
(58) Field of Search .................................. 425/549, 567, 425/568, 569, 570

(56) References Cited

U.S. PATENT DOCUMENTS

| | | | | |
|---|---|---|---|---|
| 3,677,682 A | * | 7/1972 | Putkowski | 425/192 |
| 4,588,367 A | * | 5/1986 | Schad | 425/549 |
| 4,875,848 A | * | 10/1989 | Gellert | 425/549 |
| 5,507,637 A | * | 4/1996 | Schad et al. | 425/549 |
| 5,591,465 A | * | 1/1997 | Babin | 425/549 |
| 5,705,202 A | * | 1/1998 | Gellert | 425/549 |
| 5,707,664 A | * | 1/1998 | Mak | 425/549 |
| 5,896,640 A | * | 4/1999 | Lazinski et al. | 29/428 |
| 6,062,846 A | * | 5/2000 | Kalemba | 425/549 |
| 6,261,084 B1 | * | 7/2001 | Schmidt | 425/564 |

OTHER PUBLICATIONS

Thornton et al., "Fundamentals of Engineering Materials", 1985, Prentice–Hall., Inc., pp. 435, 442, 999.*
Rosato et al.: Injection Molding Handbook (2nd Ed.) 1995 Chapman & Hall (pp. 262–266 and 291).*

* cited by examiner

Primary Examiner—Nam Nguyen
Assistant Examiner—Donald Heckenberg
(74) Attorney, Agent, or Firm—McDermott, Will & Emery; Paul Devinsky

(57) ABSTRACT

A dynamic molten mass guide sleeve disposed to articulate to compensate for differences in expansion between an inner hot flow hot channel injection and mold cavity with air gap insulation therebetween. Prior fixed molten mass guide sleeves required extremely stringent location deviations and often led to mold cavity ruptures or leakage as a result of differential expansion between the nozzle body having the hot flow channel and the mold cavity channel. The inventive sleeve is fitted with peripheral sealing lips at each end and is mounted between the body having the hot flow channel and the mold cavity (6). The sleeve compensates for differential heat expansion while enabling well-defined temperature separation in the mold feed orifice area of the injection mold by sealing the air gap (4).

6 Claims, 2 Drawing Sheets

MOVABLE MOLTEN MASS GUIDE SLEEVE TO COMPENSATE FOR TEMPERATURE-DEPENDENT EXPANSION BETWEEN THE HOT CHANNEL AND THE MOLD FEED ORIFICE

FIELD OF THE INVENTION

The present invention relates to hot runner systems for use in injection molding systems in connection with the treatment of thermoplastic materials.

BACKGROUND

Prior art systems have used rigidly mounted molten mass guide sleeves. The expansion of such guide sleeves must be calculated very precisely. This application requires extremely stringent mounting tolerances and often lead to mold cavity ruptures or leakage as a result of temperature differences. Moreover, higher temperatures may lead to ruptures since there is not enough room for the expansion. In addition, lower temperatures may lead to leakage since it results in excessive play between the sealing lip and the feed orifice of the mold cavity.

DETAILED DESCRIPTION OF THE INVENTION

Figure 1:
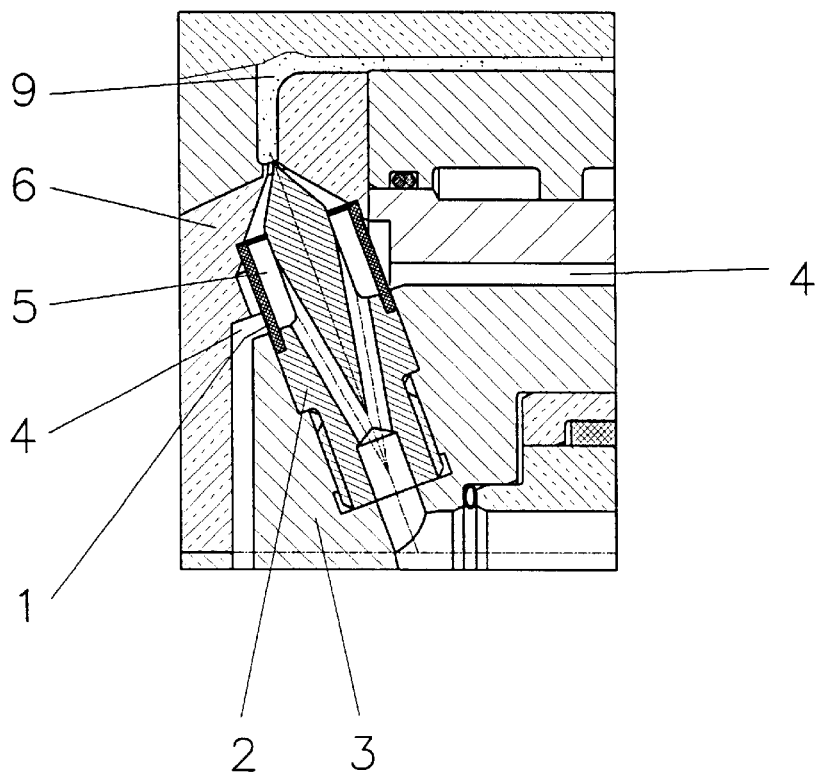
FIG. 1 depicts a molten mass guide sleeve in an obliquely oriented section.
Figure 2:
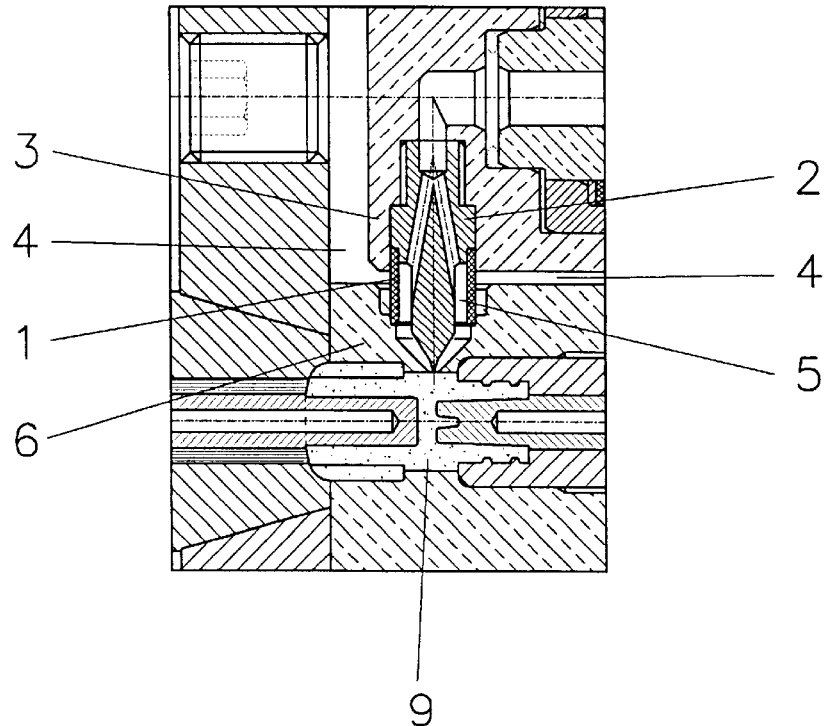
FIG. 2 depicts a molten mass guide sleeve in a radially oriented section.
Figure 3:
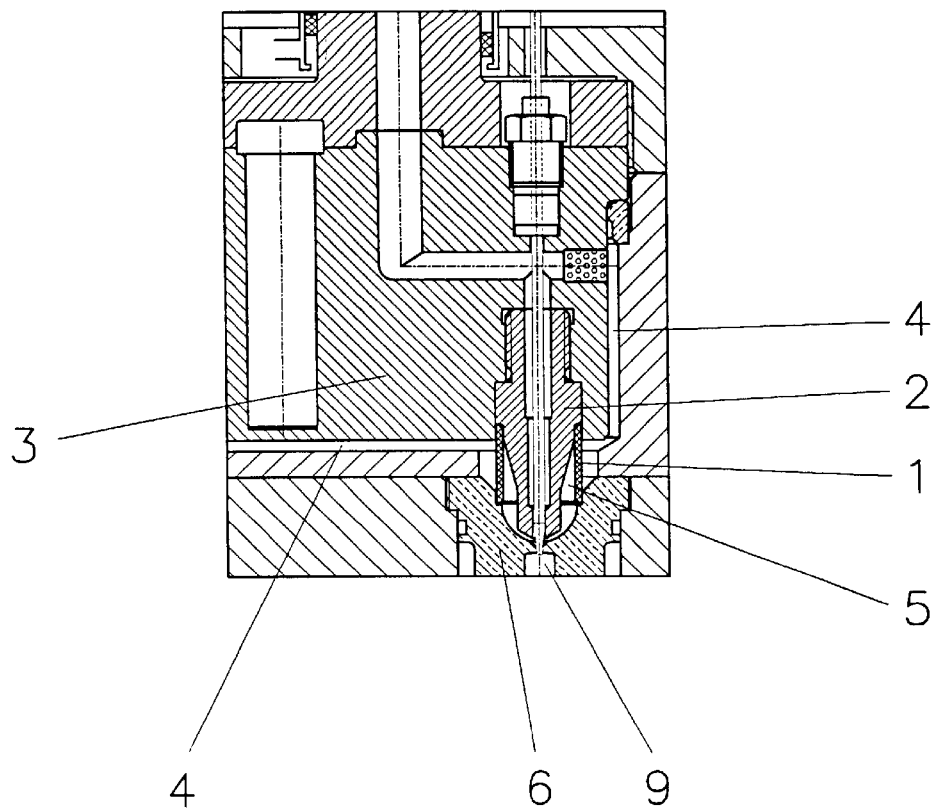
FIG. 3 depicts a molten mass guide sleeve in an axially oriental section.
Figure 4:
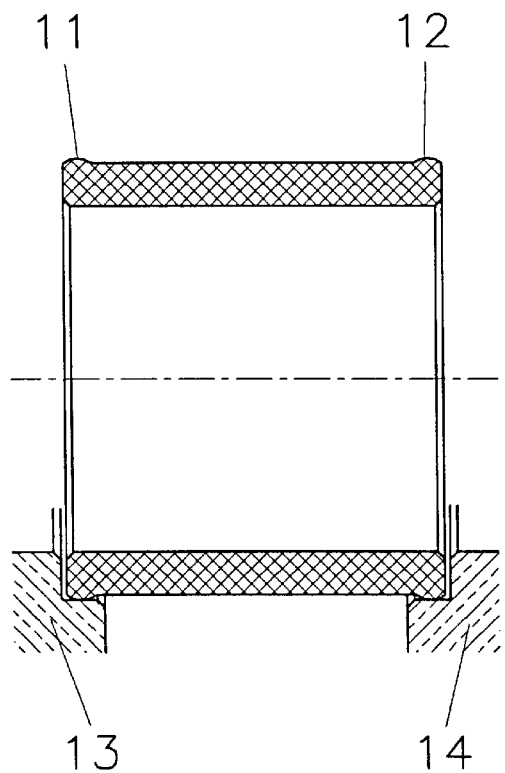
FIG. 4 depicts a detail of a molten mass guide sleeve according to the invention, wherein reference numerals 11 and 13 refer to a hot runner area, and reference numerals 12 and 14 refer to a relatively colder mold cavity area.

The present invention relates to the feed orifice area used in an air gap insulated inner hot flow runner system for the treatment of thermoplastic materials.

A hot flow runner system may be mounted in an injection molding tool. In turn, the injection molding tool is part of an injection molding machine. The injection molding machine introduces molten thermoplastic materials into the injection molding tool under high pressure (up to 2,500 bar) and at high temperatures (up to 400° Celsius). The hot molten mass is supplied through a heated hot runner system (3) to a cooled or tempered mold cavity (6).

Consequently, a heated hot runner system (3) is located adjacent the cooled mold cavity tool. The two parts must be thermally separated without prejudice to flow tightness.

In this regard, however, the better the insulation between the hot flow runner system and the cooler mold cavity, the better the operation of the hot flow runner.

The best possible thermal separation is provided by an air gap (4).

As alluded to above, the temperature differential between the hot runner system (3) and mold cavity (6 and 9) may causes differential expansion between these parts.

Therefore, a molten mass guide sleeve (1) according to the invention is used as a connecting piece positioned between the heated hot runner system (3) and the cooler mold cavity (6 and 9).

The molten mass guide sleeve surrounds a needle of the nozzle (2) which guides the molten mass (5) from the hot runner system of the heated nozzle body (3) to the feed orifice (9) in the mold cavity (6).

Heating causes relative movement, which is absorbed by the molten mass guide sleeve (1) without losses in tightness despite high internal pressures and high temperature differences. The molten mass guide sleeve (1) has cambered sealing lips at each end at the circumference thereof.

The cylindrical outlet of the hot runner system of the heated nozzle body and the cylindrical inlet of the relatively cooler mold cavity form the two sealing elements which cooperate with the molten mass guide sleeve. The molten mass guide sleeve is loosely mounted so that it can articulate between the heated nozzle body outlet and mold cavity inlet.

In the case of multiple nozzles or lateral thermoplastic feeding methods, minor geometrical errors due to the expansion of the heated hot runner system are inevitable. The outlet of the hot nozzle body may not be exactly aligned with the inlet of the mold cavity.

This error is compensated by the molten mass guide sleeve without any loss of tightness. In addition, the high internal pressure executed by the thermoplastic slightly inflates the sleeve and firmly presses the sealing elements or lips against the circumference of the nozzle body outlet and the mold cavity inlet, thus ensuring absolute tightness.

This allows for greater distances between the zero point of expansion of the nozzle body relative to the feed orifice of the mold cavity as compared to prior art systems.

What is claimed is:

1. An injecting molding apparatus having a molten mass guide sleeve for delivering molten thermoplastic material to a mold cavity through an insulating air gap between a hot flow runner system and the mold cavity wherein the molten mass guide sleeve is movably disposed between the hot flow runner system and the mold cavity to accommodate differential expansion between the hot flow runner system and the mold cavity, wherein the hot flow runner system includes a heated nozzle body and the molten mass guide sleeve comprises a connecting device for guiding the thermoplastic plastic material from the heated nozzle body to the cooler mold cavity essentially without leakage of molten thermoplastic material.

2. The injection molding apparatus having a molten mass guide sleeve according to claim 1, wherein the molten mass guide sleeve is operable to accommodate internal pressures up to 2,500 bar and temperature differences up to 400° Celsius.

3. The injection molding apparatus having a molten mass guide sleeve according to claim 2, wherein the molten mass guide sleeve is loosely mounted between said hot flow runner system and the mold cavity and further comprising a circumferential seal at each end thereof.

4. The injection molding apparatus having a molten mass guide sleeve according to claim 3, wherein said circumferential seal further comprises a circumferential cambered sealing lip at each end of said molten mass guide sleeve.

5. The injection molding apparatus having a molten mass guide sleeve according to claim 3, wherein the internal pressure is operable to expand the molten mass guide sleeve, thereby providing a circumferential sealing action at each of cambered ends.

6. The injection molding apparatus having a molten mass guide sleeve according to claim 3, wherein said circumferential seals are operable to compensate for geometrical irregularities in the hot runner system and the mold cavity caused by differential expansion.

* * * * *